United States Patent Office 2,950,559
Patented Aug. 30, 1960

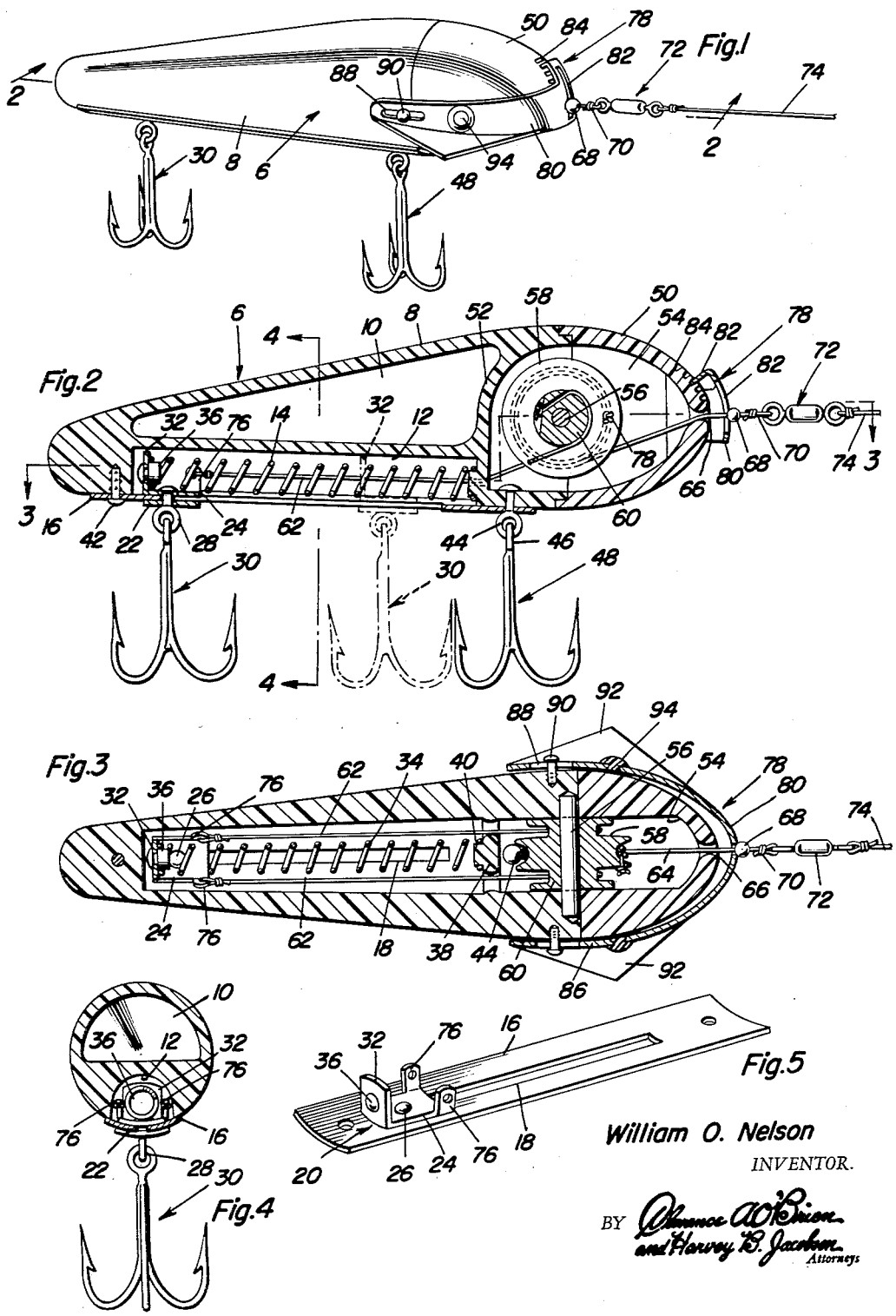

2,950,559

FISHING LURE

William O. Nelson, 1864 Grove St., Sarasota, Fla.

Filed Oct. 24, 1958, Ser. No. 769,419

6 Claims. (Cl. 43—42.02)

The present invention relates to an artificial fishing lure in the form of a novel plug having, among other features, depending multiple prong hooks, one hingedly attached to the forward portion and the other hingedly attached and mounted on a slide which is movable toward the first named hook.

A more specific aspect of the improved lure is that the relatively slidable hook is spring-biased so that it has a normal ready-to-function position at the rearward end of the plug.

A further improvement has to do with a hollow head portion in an improved structurally distinct plug having a reel therein, the body and rear end portion being formed with a lengthwise spring containing portion to accommodate the rear hook biasing spring.

A preferred embodiment of the plug or lure is that the leader is not exposed and does not extend forwardly of the plug until a fish is hooked and a pull is exerted on the line. Therefore, the leader is not visible to the fish before the strike is had and completed. Also, the construction eliminates time and trouble for the fisherman when attaching the line inasmuch as it is not necessary to put on a leader. Then, too, the fisherman can reel the plug or lure close to the tip of the rod.

The concept in addition to the above features, forward and rearward hooks which are so arranged that regardless of which hook the fish strikes the other will close in and hook on the side of the mouth or head as the case may be. In this connection, it is to be explained that many fish are lost on ordinary lures because the mouth of the fish is tough and it is difficult to bring about an effective set of the hook. Then, again other fish have a tender mouth and often the hook tears loose and the fish escapes. It follows therefore that the invention features an arrangement of hooks wherein the two hooks combine their function in insuring better and more reliable fishing results.

Objects, features and advantages not specifically touched upon above will be evident, whether stressed or not, from the specification, the collective views of the drawing, and the claims defining the nature of the contribution to the art.

In the drawings:

Fig. 1 is a perspective view of a fishing plug or lure constructed in accordance with the invention and showing it rigged and ready for use by a fisherman.

Fig. 2 is a view in section and elevation taken on an enlarged scale on the plane of the line 2—2 of Fig. 1.

Figs. 3 and 4 are sections on the lines 3—3, and 4—4, respectively, of Fig. 2.

Fig. 5 is a perspective view of a spring-biased slide accommodating and supporting plate or saddle.

Referring now to the drawing the plug, of suitable material, is representative of a minnow and is denoted generally by the numeral 6. It comprises a rearwardly tapering body portion 8 having a hollow dead-air cell 10 which is employed to give buoyancy to the body portion. The bottom part of the body portion is bored or otherwise hollowed out or shaped to provide an elongated housing or cylinder 12 for a coil spring 14. The otherwise open bottom portion of this cylinder is covered or closed-in by a saddle-like cover plate 16 provided centrally with a lengthwise slot 18 which slot may be more specifically set forth as a track for the novelty constructed slide or sliding anchor 20. This anchor embodies an arcuate shoe 22 and the plate portion 24 and shoe 22 serve to accommodate the headed shank 26 of a screw eye 28 which serves to hingedly mount an eye on the shank of the triple prong rear or rearward fishing hook 30. The slide also embodies an upstanding lug 32 which provides an anchor for the rearwardmost coil or convolution of the coil spring 34. The other end of the spring is centered and anchored on a similar axial lug. The lug on the part 32 is denoted by the numeral 36 and the complemental one on the forward partition-like member 38 is denoted by the numeral 40. Thus the two lugs support the ends of the coil spring and the coil spring is confined in the chamber and held satisfactorily in place by the attachable and detachable slightly arcuate cover plate 16. The saddle plate 16 is satisfactorily screwed or otherwise held in its intended position against the ventral side of the plug as at 42. The eye fastener 44 at the front serves to accommodate the eye 46 on the shank of the forward or front triple prong hook 48. The hook 48 may be conveniently referred to as the relatively stationary hook and the hook 30 as the free swinging, sliding and therefore relatively "movable" hook. In any event the hooks normally assume the spaced apart full line position seen in Figs. 1 and 2 in particular.

Before touching upon the pull actuated means, which functions to retract or compress the coil spring, it is advisable to introduce now the hollow head 50 which head cooperates with the partition 52 in defining a hollow chamber. This chamber is denoted at 54 and serves to accommodate a suitable rotatably mounted shaft 56 carrying a triple-part pulley. The main pulley part is at the center and is denoted by the numeral 58 and the two auxiliary pulleys are denoted at 60. These auxiliary pulleys serve to wind the forward end portions of a pair of pull cords 62 thereon. The normally hidden leader 64 is wound on the main pulley and a portion thereof passes through a central hole 66 in what may be called the nose of the head, there being a stop ball 68 and the leader being tied or secured at 70 to a suitable swivel 72 to which the fishing line 74 is appropriately connected. The aforementioned winding and slide operating cords 62 are attached to attaching ears 76 which are provided therefor on the aforementioned slide, that is the plate portion of the slide. The plate portion and the shoe 22 and the accompanying shank of the fishhook attaching eye provides a unitary device which slides back and forth in the track forming slot 18. The knotted end of the leader is suitably attached to the main or center pulley 58.

Normally, the leader is hidden from view within the confines of the pulley chamber 54. It is almost wholly wound on the main pulley 58 with a nominal forward end portion extending through the nose opening 66 as illustrated in the drawing.

The slotted plate or saddle 16 is sandwiched between the shoe 22 and the plate portion 24 of the slide. Actually the expression "slide" is intended to cover not only the part 20 but its companion arcuate shoe and perhaps too the eye bolt or eye screw 28 which provides a sliding support for the rearward triple prong or equivalent fishhook 30. The hook 30 and the slide assume the position seen in full lines at the rear end in Fig. 2 under normal circumstances. Assuming that a bite has been had and further assuming that the victim-fish has been snagged, let us say, in the mouth by the forward fishhook 48, the fish exerting a pull in one direction and the fisherman exerting a pull on the line 74 in the opposite direction will result in the leader 64 unwinding from the pulley 58. At the same time, this rotation of the pulley will cause the cooperating end portions of the cords or equivalent elements 62 to wind on their respective pulleys or reels 60. Consequently, the slide moves forward against the tension of the spring and under most circumstances the hook 30 becomes a companion with the hook 48 so that the two hooks together assuming the dotted and full lines positions shown at the right in Fig. 2 serve to make sure that the fish stays caught and cannot wiggle himself off of the hook or hooks, as the case may be. When there is no pull on either the plug or the line the leader again winds on the main reel or pulley 58 because the tension of the coil spring 14 now being relieved forces the slide back to its original position, unwinds the cords 62 and imparts rotation to the reel to wind up the leader thereon.

The two hooks and the spring means and the specially constructed plug cooperate in effectually setting the hooks to make a satisfactory catch. However, the coil spring also is a balance-type shock absorber in that where the fish takes the hook 30, the two hooks may alternately spring or yield toward and from each other avoiding the likelihood of breakage of the leader or line in the event that a too large fish may have been trapped on the line. Also, the hooks serve singly and collectively to make sure of the catch and avoid the likelihood of breakage by offering shock absorbing properties to the fishing line in relation to the plug which is carried thereby.

The invention also features means on the nose or head of the plug to assist in enabling one to control the behaviour of the plug in diving down or travelling up and this is accomplished through the medium of a simple U-shaped yoke or bridle 78. This may be of suitable stainless steel and the bight portion 80 has an elongated slot 82 to accommodate the portion of the leader having the ball 68 thereon. The ball provides a stop and limits the wind-up action of the leader on the main reel or pulleys 58. Because of the spring tension exerted on the leader tension is also exerted on the ball 68 so that it becomes a retainer for the bridle. That is to say the laterally bent detent 82 on the bight portion which is selectively engageable with the keeper seats 84 in the exterior surface of the nose in the manner seen in the drawings. The arm portions 86 have slots 88 therein slidingly and pivotally mounted on suitable headed fasteners 90 secured to diametrically opposite sides of the forward portion of the body. The side arms have outstanding fins or vanes 92 which further facilitate controlling the intended maneuverability of the plug when in use.

It will be evident that there is definite cooperation between the spring loaded hook-equipped slide, the track means embodied in the cylinder on the ventral part of the plug, the pull cords, leader and triple-acting pulley or reel in that the stop or ball 68 when stressed against the bight portion of the bridle aids in holding the bridle in position. Incidentally, the numeral 94 designates imitation eyes to contribute to the attraction feature of the head of the plug.

While I have shown and described a preferred embodiment of the inventive concept by way of the illustrative drawing and covered in the description, I do not wish to be restricted to minor details except as expressly limited by the invention as claimed.

What is claimed as new is as follows:

1. A fishing lure comprising a plug having a spring enclosing and retaining recess formed in its ventral portion, means to close said recess, a coil spring confined and operatively housed in said recess, said closing means having a slot formed therein providing a track, a slide slidingly mounted on said track and provided with a depending fishhook, a second fishhook carried by and depending from a forward portion of the plug, said hooks being movable toward and from each other at which time the spring is compressed, a fishing line, and means connecting a portion of said fishing line with said coil spring through said slide.

2. The structure defined in claim 1 and wherein said last named means embodies a pulley mounted for free rotation in a chamber provided in a hollow head at the forward portion of said plug, a portion of the fishing line being wound on said pulley, and flexible elements connected to said slide at one end and having their opposite ends attached to and wound on cooperating parts of said pulley.

3. A fishing plug provided longitudinally and centrally of a ventral portion thereof with a recess constituting an open bottomed spring housing, a saddle plate attached to the ventral portion of the plug and substantially covering the open bottom portion of the housing, said plate having an elongated slot formed therein providing a track, a slide operable in said housing and having a portion slidably keyed in said slot, a portion of said slide being provided with a depending fishhook, a second fishhook attached to a forward end portion of the plug and depending therefrom, said fishhooks cooperating with each other, and a coil spring arranged in said housing and having one end bearing against said slide to hold the same in a position wherein the first fish hook is spaced from the second hook and means to move said hooks toward each other against the action of the spring.

4. The structure defined in claim 3 and wherein a forward portion of the plug has a hollow head providing a reel chamber, a reel mounted for free rotation in said chamber, said reel having a main pulley portion and auxiliary pulley portions at the end thereof, and wherein said means includes a pair of cords attached at rear ends to said slides and extending forwardly from said housing and having their forward ends wound upon said pulley portion.

5. The structure defined in claim 4 and a leader having an end portion wound on said main pulley portion.

6. The structure defined in claim 5 and in combination, a substantially U-shaped bridle having a bight portion and arm portions slotted and hingedly and slidingly mounted on diametrically opposite sides of said plug, said arms straddling the head of the plug, said head having keeper seats, the bight portion of said bridle being provided with a detent releasably engageable with said keeper seats, and said arms having outstanding fin-like vanes, the bight portion of said bridle having a slot therein to permit passage of a portion of the leader therethrough, that portion of the leader passing through said slot being provided with a stop element and said stop element being directly engageable with an adjacent surface of the bight portion.

References Cited in the file of this patent
UNITED STATES PATENTS

| | | |
|---|---|---|
| 1,220,921 | Wilson | Mar. 27, 1917 |
| 1,393,617 | Frame | Oct. 11, 1921 |
| 2,281,831 | Courville | May 5, 1942 |
| 2,813,365 | Cross | Nov. 19, 1957 |